United States Patent
Krein et al.

(10) Patent No.: US 9,348,861 B2
(45) Date of Patent: May 24, 2016

(54) CAPTURING CHANGE DATA OF DEFERRED UPDATES

(71) Applicant: International Business Machines Corporation, Armonk, NY (US)

(72) Inventors: Terry L. Krein, Campbell, CA (US); Francis J. Ricchio, San Jose, CA (US); Judy Y. Tse, San Jose, CA (US); Gregory W. Vance, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 14/023,460

(22) Filed: Sep. 10, 2013

(65) Prior Publication Data
US 2015/0074062 A1 Mar. 12, 2015

(51) Int. Cl.
*G06F 17/30* (2006.01)

(52) U.S. Cl.
CPC .... *G06F 17/30377* (2013.01); *G06F 17/30345* (2013.01); *G06F 17/30365* (2013.01); *G06F 17/30557* (2013.01)

(58) Field of Classification Search
CPC .................. G06F 17/30286; G06F 17/30557; G06F 17/30365
USPC ......................................... 707/689, 609, 705
See application file for complete search history.

(56) References Cited

U.S. PATENT DOCUMENTS

| | | | |
|---|---|---|---|
| 5,778,388 A | 7/1998 | Kawamura et al. | |
| 5,930,794 A * | 7/1999 | Linenbach | G06F 17/30377 |
| 6,480,847 B1 * | 11/2002 | Linenbach | G06F 17/30377 707/600 |
| 7,117,229 B2 * | 10/2006 | Marshall | G06F 17/30339 |
| 7,490,084 B2 * | 2/2009 | Kothuri | G06F 17/30327 |
| 7,502,801 B2 | 3/2009 | Sawdon et al. | |
| 8,108,356 B2 | 1/2012 | Whang et al. | |
| 8,131,698 B2 * | 3/2012 | Synge | G06F 17/30457 707/705 |
| 8,176,022 B1 * | 5/2012 | Garcia | G06F 9/528 707/704 |
| 8,250,028 B2 * | 8/2012 | Synge | G06F 17/30457 707/609 |
| 8,341,125 B2 | 12/2012 | Mitchell et al. | |
| 2006/0074955 A1 * | 4/2006 | Kuersch | G06F 17/30557 |
| 2008/0235291 A1 * | 9/2008 | Lahiri | G06F 11/2035 |
| 2014/0365428 A1 * | 12/2014 | Snaman, Jr. | G06F 17/30365 707/609 |

OTHER PUBLICATIONS

"Dynamic policy based latency management in relational database replication system for differentiated quality of service (QoS)", IPCOM000169390D, Apr. 2008, all pages.
"Method and Systems for Supporting Deferred Dynamically Prepared DB2 CALL Statements on z/OS", IPCOM000207298D, May 2011, all pages.

* cited by examiner

*Primary Examiner* — Jean M Corrielus
(74) *Attorney, Agent, or Firm* — Michele Liu Baillie; North Shore Patents, P.C.

(57) ABSTRACT

The capturing of change data of deferred updates begins with the receipt of an update request call for one or more changes to a database. A processing of the update request call is deferred until a commit point is issued, where call information associated with the update request call is determined, and the call information is stored and associated with the update request call. During a processing of the commit point, data information for the one or more changes to the database is determined. The data information for the one or more changes is combined with the stored call information associated with the update request call.

12 Claims, 5 Drawing Sheets

CAPTURING CHANGE DATA OF DEFERRED UPDATES

BACKGROUND

Some database systems have an application call that can request a change to a database without locking the data at the time of the request. Instead, the processing of the update request is deferred until the application issues a commit point. For example, a database management system may defer the processing of an update request call until commit time. No locks are held and no changes are made to the database regarding the update request at the time of the request call. In fact, the same or another application may make changes to the same segment or row in the database via other non-deferred update requests that do lock the data. At commit time, the deferred update request is processed based on the current data in the database at commit time. At this time the segment or row can be set to a specific value or changed as requested by the deferred update.

The database system further captures and makes available information about updates made to the database, so that they might be replicated on some other database or table. Change capture processing normally collects information about the call at the time that the application makes the update request. In database systems where the data is locked and therefore will not change outside the scope of the current transaction, the information required for capturing the change is available at the time the call is processed. However, in a database system where the update is deferred until a commit point, the physical data information (i.e. the before and after images) is not available at the time the call is made. Further, during commit point processing, when the deferred update request is processed, not all of the call information may be available.

SUMMARY

According to one embodiment of the present invention, the capturing of change data of deferred updates begins with the receipt of an update request call for one or more changes to a database. A processing of the update request call is deferred until a commit point is issued, where call information associated with the update request call is determined, and the call information is stored and associated with the update request call. During a processing of the commit point, data information for the one or more changes to the database is determined. The data information for the one or more changes is combined with the stored call information associated with the update request call.

System and computer program products corresponding to the above-summarized methods are also described and claimed herein.

DETAILED DESCRIPTION

Figure 1:
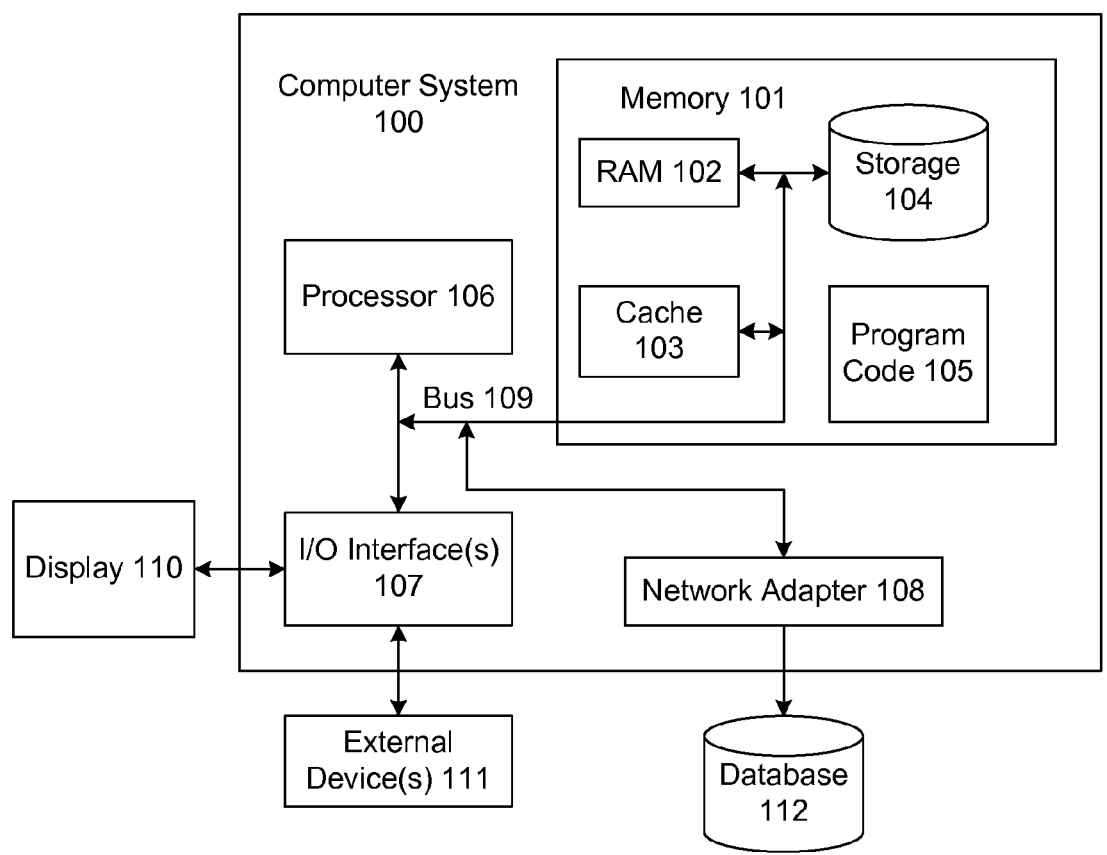
FIG. 1 illustrates a system for capturing change data of deferred updates according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates a system for capturing change data of deferred updates according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more databases 112 via network adapter 108.

Figure 2:
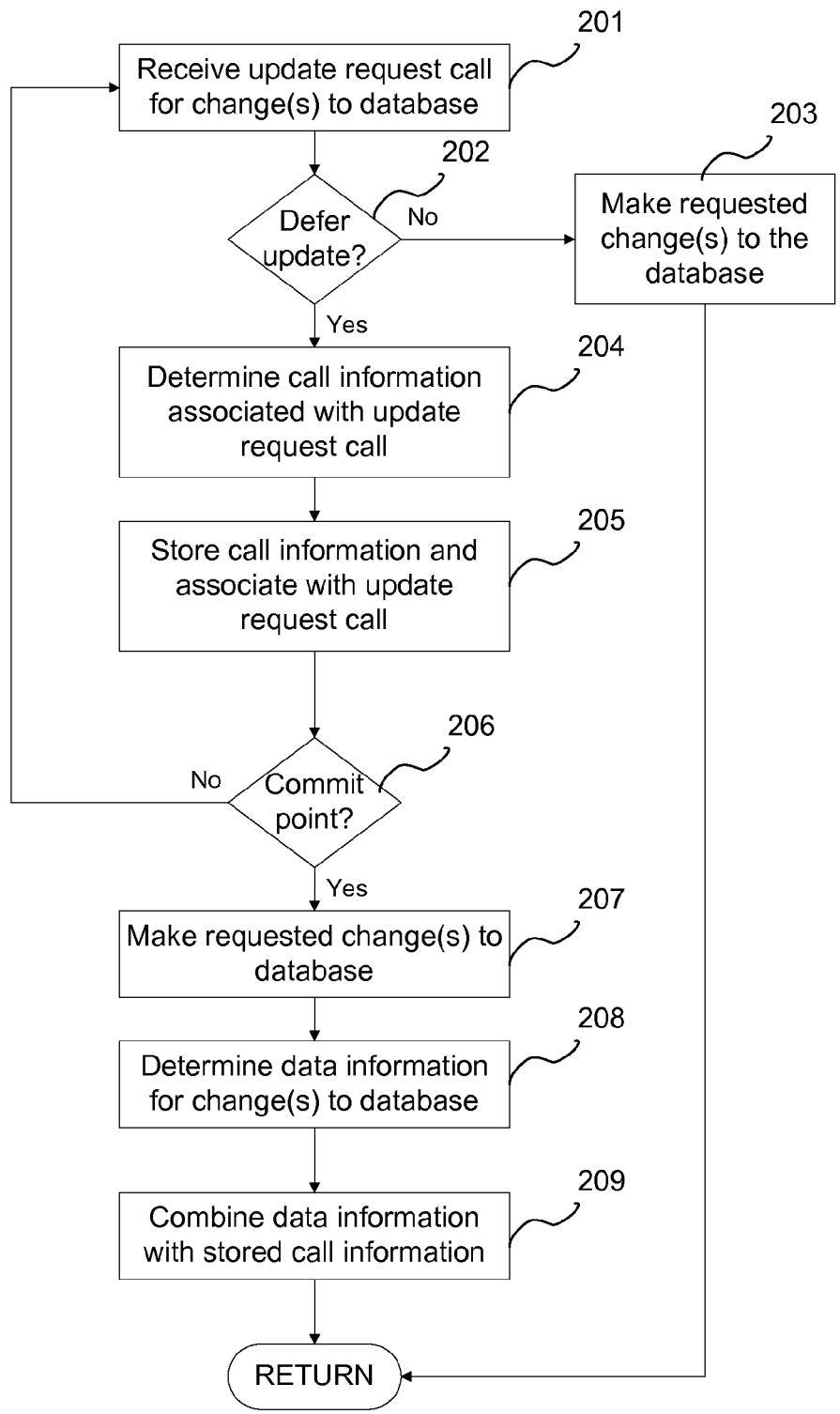
FIG. 2 illustrates a method for capturing change data of deferred updates according to embodiments of the present invention.

FIG. 2 illustrates a method for capturing change data of deferred updates according to embodiments of the present invention. Upon receiving an update request call for one or more changes to a database (201), the method determines whether the processing of the update request call is to be deferred (202), i.e., whether the update request is a deferred update request. If the update request is not a deferred update request, then the requested change(s) are made to the database (203). The collection of the call information and update data are also processed at this time. If the update request is a deferred update request, then the method determines the call information associated with the update request call (204), and stores the call information and associates it with the update request call (205). At some later point in time, a commit point is issued (206). During the processing of the commit point, the method makes the requested change(s) to the database (207). Also during commit point processing, the method determines data information for the changes to the database (208). For example, the data information may include a before image data and an updated image data. The stored call information associated with the update request call is then retrieved and combined with the data information (209). The combined information may then be stored for use by another process, such as an alter process for changing parameters for the database or a database replication process.

In this embodiment, basic call information is collected at the time the deferred update request call is made. The basic call information may include the information about the update request that is normally provided in change capture data, except for the data specific information. For example, basic call information may include information identifying the segment or row being changed and the type of update being done.

Data specific information cannot be accurately collected at the time the deferred update request call is made as the data may not be protected from updates outside the scope of this transaction at this point in time. It is not until commit point processing, when the data is locked and the deferred update is actually processed, that the true before image data and after image data for the changes are known, as well as other characteristics of the updated data, such as data length. The stored call information associated with this change is then combined with the data specific information to provide the full change capture information.

Figure 3:
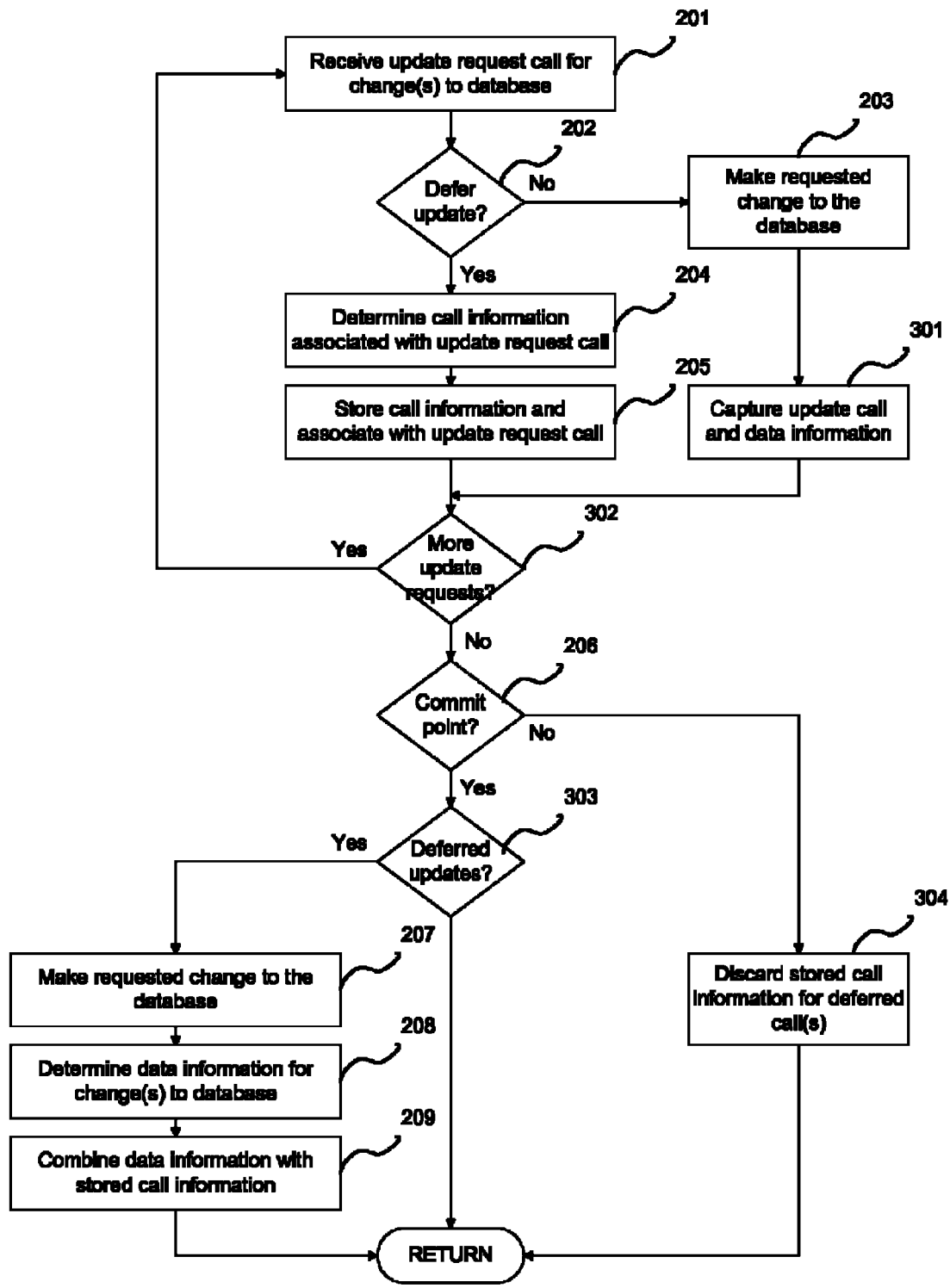
FIG. 3 illustrates in more detail the method for capturing change data of deferred updates according to embodiments of the present invention.

FIG. 3 illustrates in more detail the method for capturing change data of deferred updates according to embodiments of the present invention. In addition to the steps illustrated in FIG. 2, if the update request is not a deferred update request (202) and the requested changes are made to the database (203), the update call and data information are also captured (301). Multiple update requests may be processed prior to a commit point. Thus, if there are more update requests to be processed (302), these requests are processed per 201-205 and 301, set forth above. When a commit point is not issued (206), such as in the occurrence of a rollback, the stored call information for the deferred update requests calls are discarded (304). Example situations where the stored call may be discarded include: an application may determine that it should not complete the current transaction and thus issues a rollback; the transaction hits a deadlock and at which point the database system may fail the transaction and perform a rollback; and the application may fail, at which point the database system may perform the equivalent of a rollback of the transaction. If a commit point is issued, the method determines whether there are deferred updates to process (303). If so, then each of the deferred updates is processed per 207-209, as set forth above.

Figure 4:
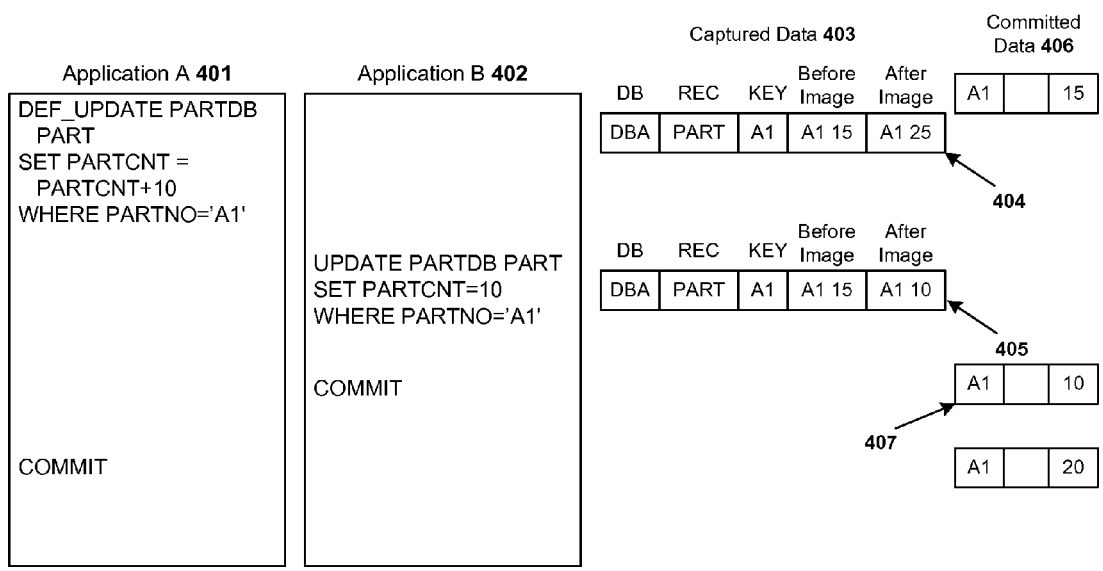
FIG. 4 illustrates the issues with deferred updates and deferred locking as it pertains to change data capture.

FIG. 4 illustrates the issues with deferred updates and deferred locking as it pertains to change data capture. Assume that Application A 401 and Application B 402 are executing simultaneously. Assume also that the starting part count for part number 'A1' is 15. Application A 401 makes a deferred update request call to increase the part count by 10, and Application B 402 makes a non-deferred update request call after Application A's call to set the part count to 10. Here, the update requested by Application B 402 is processed and committed first. The deferred update request call from Application A 401 is then processed and committed after Application B's request commits, setting the part count to 10. The captured data 403 that is available at call time for Application A 401 would indicate that the before part count=15 and the after part count=25. The captured data that is available at call time for Application B 402 would indicate that the before part count=15 and that the after part count=10. If the committed data 406 were collected and provided at the call time, the final committed data captured would be part count=10 instead of 20, which would not match what is in the database.

Figure 5:
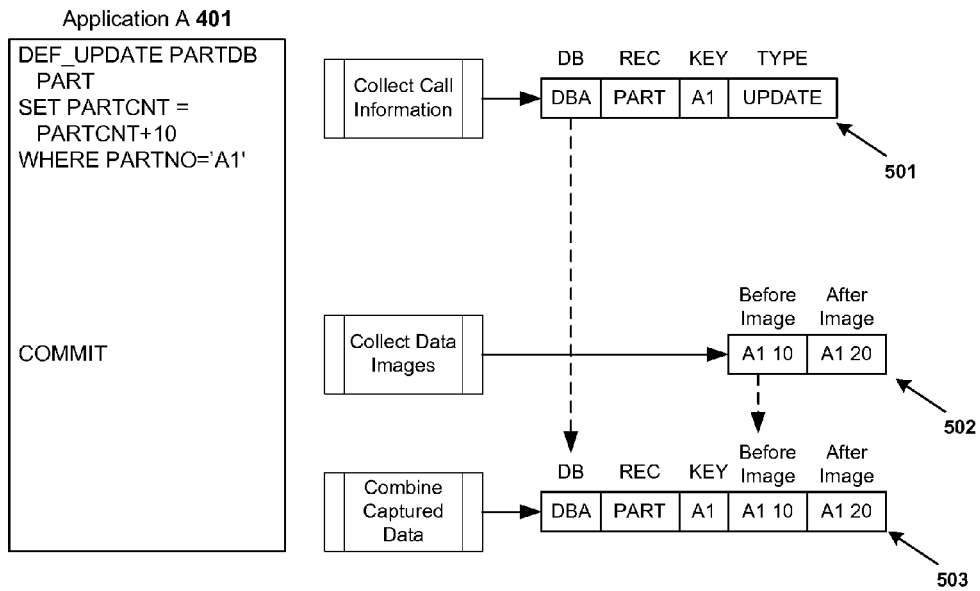
FIGS. 5 and 6 illustrate an example of capturing change data of deferred updates according to embodiments of the present invention.

FIG. 5 illustrates an example of capturing change data of deferred updates according to embodiments of the present invention. Assume that Application A 401 makes the same deferred update request call as in FIG. 4 (201-202). The method determines the call information 501 associated with the update request call from Application A 401 (204), and stores the call information and associates it with the update request call (205). The call information can include, but is not limited to, the database or table name, the record key, the segment or column name, and the type of update being requested such as update, insert or delete. The call information may be saved in any type of memory and is associated with the saved deferred update request call. Alternatively, this information could be provided as partial change capture data with an indication that the update is deferred as well as a token that uniquely identifies this update with supplemental information to be provided later.

During commit point processing (206), the data is locked and the requested changes are made to the database (207). At this time, the before image data and the updated image data 502 are collected and combined with the saved call information associated with the update request call (208-209) to provide the full change capture information 503. Alternatively, the before and after image data can be supplied as supplemental change capture information with a token corresponding to the initial partial change capture data.

Figure 6:
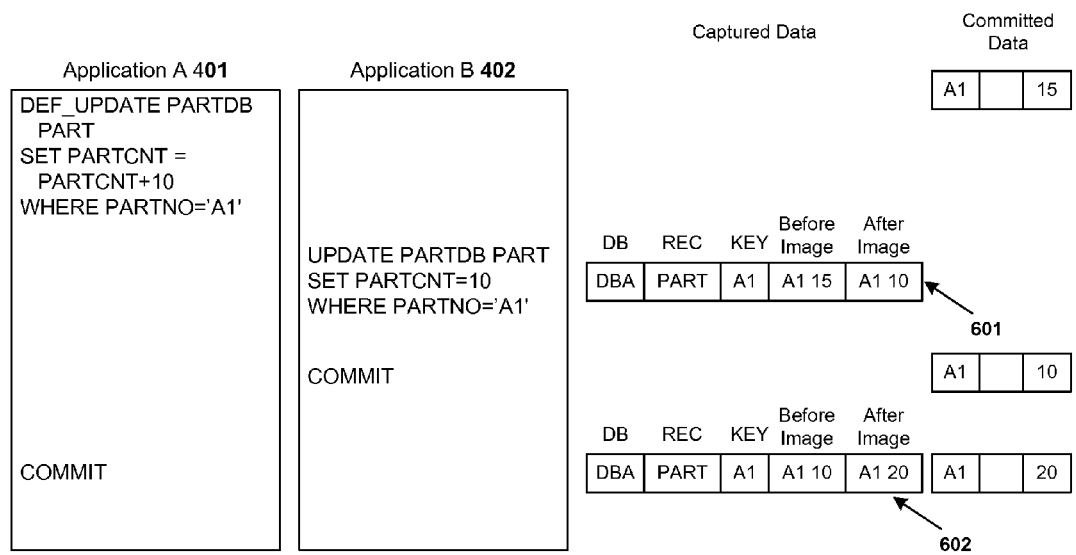

As illustrated in FIG. 6, with the embodiments of the present invention, the change capture data 601 for Application B 402 remains the same as in FIG. 4 and is correct. The change capture data 602 for Application A 401 is available during the commit point process and has a before part count=10 and an after part count=20, which matches what is on the database.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for capturing change data of deferred updates, implemented by a computing processor, comprising:
    receiving an update request call for one or more updates to data in a database;
    deferring a processing of the update request call until a commit point is issued, wherein prior to an issuance of the commit point:
        determining call information associated with the update request call by the computing processor; and
        storing the call information and associate the call information with the update request call by the computing processor;
    determining that the commit point has been issued, wherein the data in the database is not locked between the receipt of the update request call and the issuance of the commit point; and
    in response to the issuance of the commit point, processing the update request call, comprising:
        locking the data
        making the one or more updates to the data in the database according to the update request call;
        obtaining data information comprising a before update image of the data before the one or more updates and an after update image of the data after the one or more updates by the computing processor; and
        combining the data information with the stored call information associated with the update request call by the computing processor.

2. The method of claim 1, wherein the call information comprises one or more of the following: information identifying data to be changed by the processing of the update request call; and a type of update.

3. The method of claim 1, wherein the storing of the call information and associate the call information with the update request call comprises:
   storing the call information as partial change capture data comprising an indication that the update request call is deferred and a token uniquely identifying the update request call.

4. The method of claim 3, wherein the data information further comprises a second token corresponding to the partial change capture data.

5. A computer program product for capturing change data of deferred updates, the computer program product comprising:
   a non-transitory computer readable storage medium having computer readable program code embodied therewith, the program code executable by a processor to:
      receive an update request call for one or more updates to data in a database;
      defer a processing of the update request call until a commit point is issued, wherein prior to an issuance of the commit point:
         determine call information associated with the update request call; and
         store the call information and associate the call information with the update request call;
      determine that the commit point has been issued, wherein the data in the database is not locked between the receipt of the update request call and the issuance of the commit point; and
      in response to the issuance of the commit point, processing the update request call, comprising:
         lock the data;
         make one or more updates to the data in the database according to the update request call;
         obtain data information comprising a before update image of the data before the one or more updates and an after update image of the data after the one or more updates; and
         combine the data information with the stored call information associated with the update request call.

6. The computer program product of claim 5, wherein the call information comprises one or more of the following: information identifying data to be changed by the processing of the update request call; and a type of update.

7. The computer program product of claim 5, wherein the program code executable by the processor to store the call information and associate the call information with the update request call is further executable by the processor to:
   store the call information as partial change capture data comprising an indication that the update request call is deferred and a token uniquely identifying the update request call.

8. The computer program product of claim 7, wherein the data information further comprises a second token corresponding to the partial change capture data.

9. A system comprising:
   a processor; and
   a non-transitory computer readable storage medium having computer readable program code embodied therewith, the program code executable by a processor to:
      receive an update request call for one or more updates to data in a database;
      defer a processing of the update request call until a commit point is issued, wherein prior to an issuance of the commit point, comprising:
         determine call information associated with the update request call; and
         store the call information and associate the call information with the update request call;
      determine that the commit point has been issued, wherein the data in the database is not locked between the receipt of the update request call and the issuance of the commit point; and
      in response to the issuance of the commit point, processing the update request call, comprising:
         lock the data;
         make one or more updates to the data in the database according to the update request call;
         obtain data information comprising a before update image of the data before the one or more updates and an after update image of the data after the one or more updates; and
         combine the data information with the stored call information associated with the update request call.

10. The system of claim 9, wherein the call information comprises one or more of the following: information identifying data to be changed by the processing of the update request call; and a type of update.

11. The system of claim 9, wherein the program code executable by the processor to store the call information and associate the call information with the update request call is further executable by the processor to:
   store the call information as partial change capture data comprising an indication that the update request call is deferred and a token uniquely identifying the update request call.

12. The system of claim 11, wherein the data information further comprises a second token corresponding to the partial change capture data.

* * * * *